(12) United States Patent
Lyren et al.

(10) Patent No.: US 9,843,704 B2
(45) Date of Patent: *Dec. 12, 2017

(54) ARROW WITH A CAMERA

(71) Applicants: James Alexander Eugene Lyren, King of Prussia, PA (US); Philip Scott Lyren, Hong Kong (CN)

(72) Inventors: James Alexander Eugene Lyren, King of Prussia, PA (US); Philip Scott Lyren, Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/077,899

(22) Filed: Mar. 22, 2016

(65) Prior Publication Data
US 2016/0202028 A1 Jul. 14, 2016

Related U.S. Application Data

(63) Continuation of application No. 14/185,878, filed on Feb. 20, 2014, now Pat. No. 9,319,571.

(51) Int. Cl.
| | | |
|---|---|---|
| *H04N 5/225* | (2006.01) | |
| *F42B 6/04* | (2006.01) | |
| *F42B 12/36* | (2006.01) | |
| *F42B 12/42* | (2006.01) | |
| *F42B 6/08* | (2006.01) | |
| *H04N 5/232* | (2006.01) | |
| *H04N 5/77* | (2006.01) | |
| *F42B 12/38* | (2006.01) | |
| *H04N 5/44* | (2011.01) | |

(52) U.S. Cl.
CPC ............ *H04N 5/2252* (2013.01); *F42B 6/04* (2013.01); *F42B 6/08* (2013.01); *F42B 12/362* (2013.01); *F42B 12/365* (2013.01); *F42B 12/385* (2013.01); *F42B 12/42* (2013.01); *H04N 5/23206* (2013.01); *H04N 5/23209* (2013.01); *H04N 5/23241* (2013.01); *H04N 5/77* (2013.01); *H04N 5/772* (2013.01); *H04N 5/44* (2013.01)

(58) Field of Classification Search
CPC ........ H04Q 9/00; H04Q 2209/40; F42B 6/04; F42B 6/08; F42B 12/02; G08C 17/02
USPC ......... 348/143, 144, 373; 340/539.13, 572.8, 340/573.2, 578; 473/570, 578
See application file for complete search history.

(56) References Cited

U.S. PATENT DOCUMENTS

| | | | | |
|---|---|---|---|---|
| 5,779,576 A | * | 7/1998 | Smith, III | .............. A63B 65/00 473/570 |
| 7,862,457 B1 | * | 1/2011 | Urcheck | ................... F42B 6/06 473/570 |
| 2004/0036770 A1 | * | 2/2004 | Adams | ................... H04N 7/183 348/157 |
| 2004/0196367 A1 | * | 10/2004 | Raymond | ............. F42B 12/365 348/144 |
| 2011/0226038 A1 | * | 9/2011 | Donahoe | ................... F42B 6/04 73/12.05 |
| 2012/0035006 A1 | * | 2/2012 | Bay | ........................... F41G 1/35 473/570 |
| 2012/0196708 A1 | * | 8/2012 | Maddox | ................... F42B 6/04 473/570 |
| 2013/0210563 A1 | * | 8/2013 | Hollinger | ............. H04N 5/2252 473/570 |

(Continued)

*Primary Examiner* — Kelly L Jerabek

(57) ABSTRACT

An arrow includes an arrowhead, a shaft, a nock, and an internal cavity. The internal cavity includes a camera.

20 Claims, 6 Drawing Sheets

(56) References Cited

U.S. PATENT DOCUMENTS

| | | | |
|---|---|---|---|
| 2014/0256479 A1* | 9/2014 | Bynum, Jr. | F42B 6/08 473/470 |
| 2014/0266706 A1* | 9/2014 | DiSanto | G08C 19/16 340/539.13 |
| 2014/0274499 A1* | 9/2014 | York | F42B 6/04 473/570 |

* cited by examiner

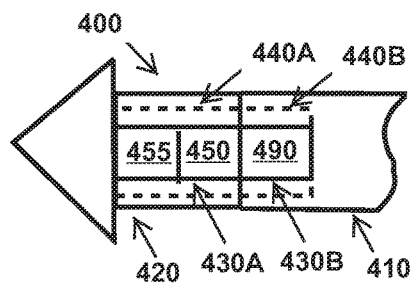
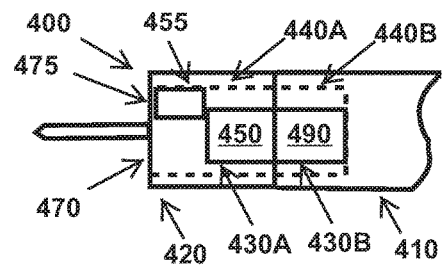
Figure 4A  Figure 4B
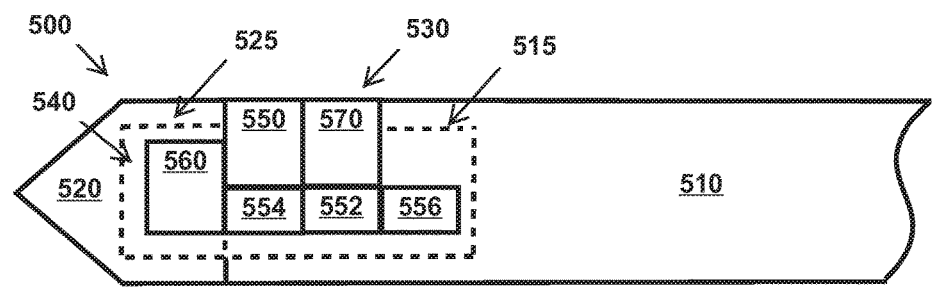
Figure 5
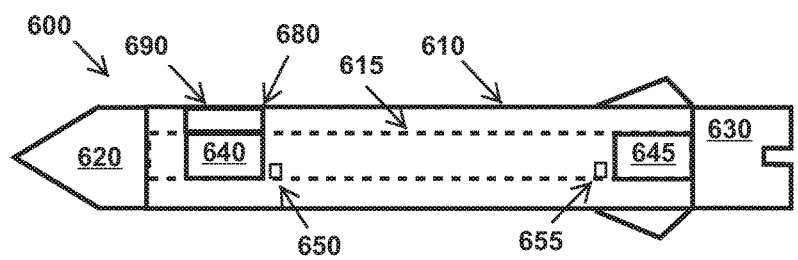
Figure 6

ARROW WITH A CAMERA

BACKGROUND

Bows and arrows predate recorded history and are still popular today with hunting and sports enthusiasts. The basic elements of the bow and arrow have essentially remained unchanged throughout the years. Advancements in material, computer design, and technology, however, enable improvements to be made to the bow and arrow. Such improvements assist in increasing accuracy and efficiency of the bow and arrow and also aid in maintaining the popularity of archery.

BRIEF DESCRIPTION OF THE DRAWINGS

FIG. 4A is a side view of an arrow in accordance with an example embodiment.

FIG. 4B is a top view of the arrow of FIG. 4A in accordance with an example embodiment.

FIG. 5 is a partial view of another arrow in accordance with an example embodiment.

FIG. 6 is another arrow in accordance with an example embodiment.

SUMMARY OF THE INVENTION

One example embodiment is an arrow that includes an arrowhead, a shaft, a nock, and an internal cavity. The internal cavity includes a camera.

DETAILED DESCRIPTION

Example embodiments include methods and apparatus directed to an arrow with one or more electronic devices.

Figure 1:
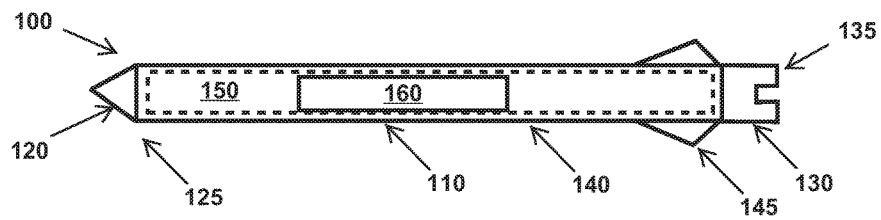
FIG. 1 is an arrow in accordance with an example embodiment.

FIG. 1 is an arrow 100 with an elongated body 110 that includes a point or an arrowhead 120 located at one end 125 and nock 130 located at an oppositely disposed end 135. A cylindrical shaft 140 extends between the arrowhead 120 and nock 130 and includes a fletching 145 located adjacent to the nock 130. An internal cavity 150 (shown in dashed lines) extends in one or more of the arrowhead 120, nock 130, and shaft 140.

One or more electronic devices or electronic components 160 are located in the internal cavity 150. The electronic devices or components can be located in one or more of the arrowhead, the shaft, the nock, and external locations, such as being connected to or mounted to an exterior surface of the arrowhead, the shaft, and/or the nock.

The electronic devices or components 160 include, but are not limited to, one or more of a camera and/or lens, a processor, a memory, an interface, a display, a transmitter, a power source (such as a battery, solar cells, or a thermocoupler), an antenna, a light source (such as a light-emitting diode (LED)), an accelerometer, a photodetector (such as a photodiode), a sensor, a receiver, a transceiver, a timer, a laser, a global positioning system (GPS) chip, a switch, a radio-frequency identification (RFID) chip, a microphone, a speaker, a sound recorder, a data recorder, and other electronic device.

Figure 2:
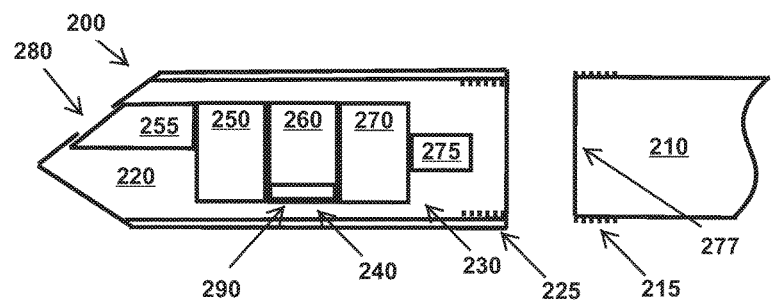
FIG. 2 is a partial view of an arrow in accordance with an example embodiment.

FIG. 2 is a partial view of an arrow 200 that includes a shaft 210 with threads 215 and an arrowhead 220 with threads 225 that removably connect the arrowhead to the shaft. The arrow 200 is shown with the arrowhead 220 and a partial view of the shaft 210.

The arrowhead 220 includes an internal cavity 230 that encloses or houses one or more electronic components 240 (such as one or more of the electronic components discussed herein). By way of example, these electronic components include a camera 250 with a lens 255, a transmitter 260, and a battery 270. These electronic components are electrically coupled or connected together.

A switch 275 controls power supplied from the battery 270 to the camera 250 and the transmitter 260. For example, the switch is an on/off switch that a user manually moves to activate and de-activate the battery. As another example, the switch activates when an end 277 of the shaft 210 pushes against or touches the switch (e.g., when the shaft is connected with or engaged to the arrowhead). As yet another example, the switch is a channel selector for wirelessly transmitting images.

The arrowhead 220 includes an opening or window 280 through which the lens 255 is directed to capture images that are external to the arrow 200. The lens 255 is positioned adjacent to or forms part of the window 280, and the lens 255 can capture images through the window when the arrowhead is connected to and engaged with the shaft 210 in an assembled arrow.

The window 280 can be formed to have a sharp point to serve as a tip or point for the arrowhead 220. Alternatively, the window 280 can be positioned near or adjacent to one or more sharp points, such as positioning the window adjacent to one or more sharp points of a broadhead arrow tip.

The transmitter 260 can include an antenna 290 and/or connect to the shaft 210 of the arrow. The shaft can be conductive and function as an antenna for the transmitter 260. For instance, the shaft is made from a conductive material, such as aluminum, carbon fiber, etc. Further, the transmitter can be separate from the camera 250 or included in or with the camera.

Figure 3:
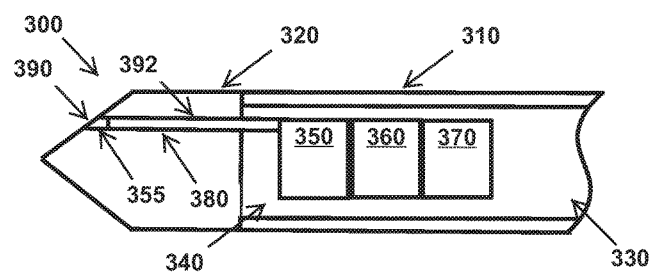
FIG. 3 is a partial view of another arrow in accordance with an example embodiment.

FIG. 3 is an arrow 300 that includes a shaft 310 that removable connects to an arrowhead 320. The arrow 300 is shown with the arrowhead 320 and a partial view of the shaft 310.

The shaft 310 includes an elongated cylindrical internal cavity 330 that encloses or houses one or more electronic components 340 (such as one or more of the electronic components discussed herein). By way of example, these electronic components include a camera 350 with a lens 355, a transmitter 360, and a battery 370. These electronic components are electrically coupled or connected together. The lens 355 connects or couples to the camera via a flexible cable 380 and extends to a window or opening 390 located in the arrowhead 320. The arrowhead 320 includes a channel or hole 392 through which the flexible cable 380 inserts.

FIG. 4A is a side view of an arrow 400 that includes a shaft 410 and an arrowhead 420 shaped as a broadhead arrow tip. FIG. 4B is a top view of the arrow 400. Electronic components 430A are located in an internal cavity 440A (shown with dashed lines) of the arrowhead 420, and electronic components 430B are located in an internal cavity 440B (shown with dashed lines) of the shaft 410.

The internal cavity 440A of the arrowhead 420 encloses or houses a wireless camera 450 and lens 455 that wirelessly transmit images that the camera captures. A base or shoulder 470 of the arrowhead 420 includes an opening or window 475 through which the lens 455 captures images that are external to the arrow 400.

The internal cavity 440B of the shaft 410 encloses or houses a battery 490. When the arrowhead 420 engages with or connects to the shaft 410, the battery 490 completes a circuit to power the camera 450. For example, screwing the arrowhead 420 to the shaft 410 causes electrical contacts of the battery to engage electrical contacts of the camera 450. Unscrewing the arrowhead 420 from the shaft 410 causes the electrical contacts to disengage.

FIG. 5 is an arrow 500 that includes a shaft 510 with an internal cavity 515 (shown with dashed lines) and an arrowhead 520 with an internal cavity 525 (shown with dashed lines). The arrow 500 is shown with the arrowhead 520 and a partial view of the shaft 510.

Electronic components 530 are located in the cavity 515 of the shaft, and electronic components 540 are located in the cavity 525 of the arrowhead 520. By way of example, the electronic components 530 include a display 550, an LED 552, a sensor 554, and other electronic components 556; and the electronic components 540 include a battery 560.

The shaft 510 and the arrowhead 520 engage together such that the electronic components 530 engage or come in contact with the electronic components 540. This engagement causes the battery 560 to power the display 550, the LED 552, the sensor 554, and the other electronic components 556.

The shaft 510 includes a clear or transparent section 570 adjacent the LED 552. Light from the LED 552 passes through the transparent section 570 and provides a visual indication that shaft 510 and the arrowhead 520 are properly or securely connected. The transparent section 570 and/or the LED can be colored in order to provide a shooter with the visual indication (such as providing a green light to indicate the electronic components are properly connected and functioning and a red light to indicate that the electronic components are not properly connected and functioning). For instance, this light visually indicates that a sensor or chip is properly functioning and that a wireless camera is on, capturing images, and transmitting these images.

The display 550 displays information from the sensor 554 and other electronic components 556. The display can also display information received from another electronic device, such as an HPED in communication with the arrow.

FIG. 6 is an arrow 600 that includes a shaft 610 with an internal cavity 615 (shown with dashed lines), an arrowhead 620, and a nock 630 that are removable from and connectable to the arrow 600. The cavity 615 has an elongated cylindrical shape and extends a length of the shaft 610. Electronic components 640 are located in the cavity 615 adjacent to the arrowhead 620, and electronic components 645 are located in the cavity 615 adjacent to the nock 630.

A stop 650 at one end of the shaft prevents the electronic components 640 from moving deeper into the cavity 615, and a stop 655 at another end of the shaft prevents the electronic components 645 from moving deeper into the cavity 615. By way of example, the electronic components 640 include a wireless camera, an LED, and a battery; and electronic components 645 include a wireless camera, an LED, and a battery.

An LED illuminates to indicate that the battery is connected to and is powering the wireless camera. The shaft 610, arrowhead 620, and/or nock 630 can include a window and/or transparent material to enable light to pass from an LED and through the arrow. For example, the nock 630 is made from a transparent or translucent material. When the nock illuminates, a shooter is visually notified that the camera is on and functioning. Illumination of the LEDs can also assist the shooter in tracking a flight path of the arrow and in locating the arrow after it is shot from a bow (e.g., assist a shooter in locating a lost arrow, locating an arrow shot in brush, locating an arrow at night, locating an arrow stuck in a moving target, etc.).

The shaft 610 also includes a window, hole, or opening 680 that includes a display 690. The display has a semicircular or curved configuration that extends fully around or partially around a body of the arrow such that the shape of the display emulates a shape of the body of the shaft. An exterior surface of the display is flush with the exterior surface of the arrow, and a smooth transition occurs from the body of the arrow to the display. As such, the display does not protrude from the body since such a protrusion could disrupt a flight path of the arrow or disrupt launching of the arrow from a bow. The display displays information captured with the electronic devices and/or information from another electronic device, such as an HPED in communication with the arrow.

Figure 7:
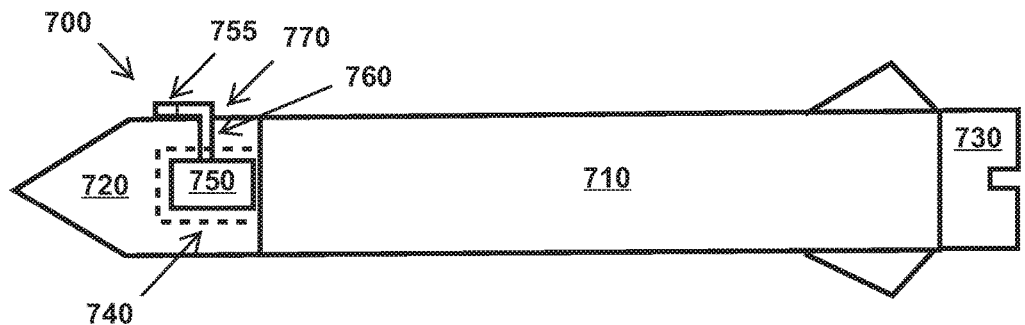
FIG. 7 is another arrow in accordance with an example embodiment.

FIG. 7 is an arrow 700 that includes a shaft 710, an arrowhead 720, and a nock 730. The arrowhead 720 includes an internal cavity 740 (shown with dashed lines) with electronic components 750 that include a wireless camera, a battery, and other electronic components. A lens 755 connects to the wireless camera with an elongated cable 760. The cable 760 extends through an opening, hole, or window 770 that is located in the body of the arrowhead 720. The lens 755 and cable 760 are attached or fixed to the arrowhead 720 to prevent them from disengaging or loosening from the arrowhead while the arrow is in use (e.g., while the arrow is being shot from a bow or impacted on a target). For instance, an adhesive or glue adheres the lens and/or cable to an exterior surface of the arrow.

Figure 8:
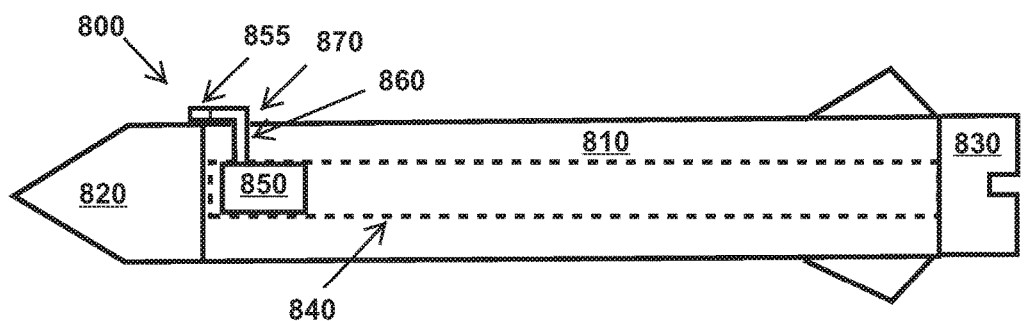
FIG. 8 is another arrow in accordance with an example embodiment.

FIG. 8 is an arrow 800 that includes a shaft 810, an arrowhead 820, and a nock 830. The shaft 810 includes an internal cavity 840 (shown with dashed lines) with electronic components 850 that include a wireless camera, a battery, and other electronic components. A lens 855 connects to the wireless camera with an elongated cable 860. The cable 860 extends through an opening, hole, or window 870 that is located in the body of the shaft 810. The lens 855 and cable 860 are attached or fixed to the shaft 810 to prevent them from disengaging or loosening from the shaft while the arrow is in use (e.g., while the arrow is being shot from a bow or impacted on a target).

Figure 9:
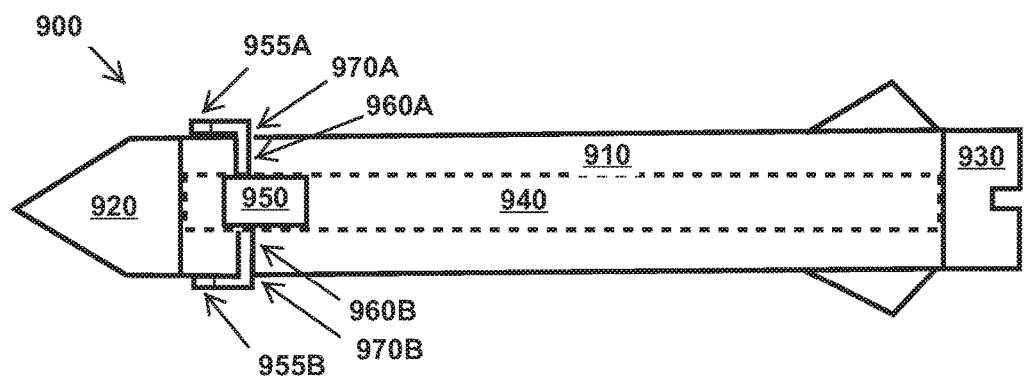
FIG. 9 is another arrow in accordance with an example embodiment.

FIG. 9 shows an arrow 900 that includes a shaft 910, an arrowhead 920, and a nock 930. The arrow 900 includes an internal cavity 940 (shown with dashed lines) with electronic devices 950 that include a wireless camera, a battery, and other electronic components. Two lenses 955A and 955B connect to the camera with cables 960A and 960B. The cables 960A and 960B extend through openings, holes, or windows 970A and 970B that are located in the body of the arrow 900. For illustration, lenses 955A and 955B are directed to a front direction or shooting direction of the arrow.

Figure 10:
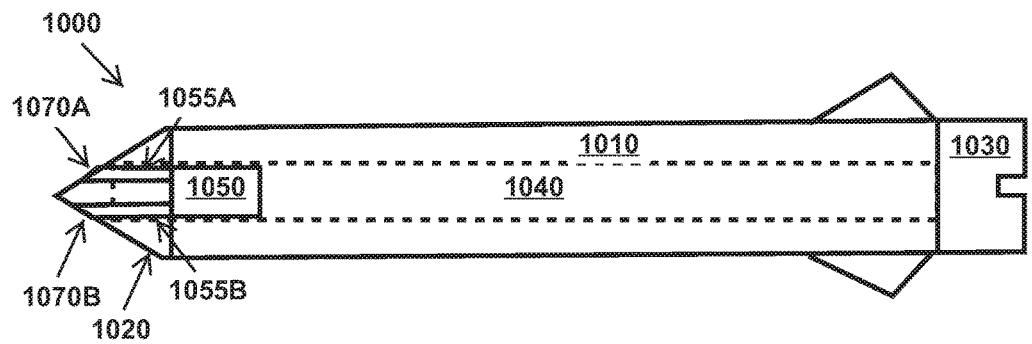
FIG. 10 is another arrow in accordance with an example embodiment.

FIG. 10 shows an arrow 1000 that includes a shaft 1010, an arrowhead 1020, and a nock 1030. The arrow 1000 includes an internal cavity 1040 (shown with dashed lines) with electronic components 1050 that include a wireless camera, a battery, and other electronic components. Two lenses 1055A and 1055B extend into or see through openings, holes, or windows 1070A and 1070B that are located in the body of the arrow 1000. For illustration, these openings 1070A and 1070B are located in the arrowhead 1020, and the lenses 1055A and 1055B are directed to a front direction or shooting direction of the arrow.

Lenses 1055A and 1055B are positioned in or adjacent to the windows 1070A and 1070B. As one example, the lenses themselves protrude into the windows such that the lenses are exposed to the ambient environment and form an exterior surface of the arrowhead. The lenses can be provided with a clear protective coating to prevent scratches or breakage. As another example, the lenses are positioned next to the windows that are transparent to enable the lenses to capture images through the windows. These windows can also be formed of a strong material to protect the lenses (e.g., protect the lenses from scratches, breakage, or other damage when the arrow impacts a target).

Figure 11:
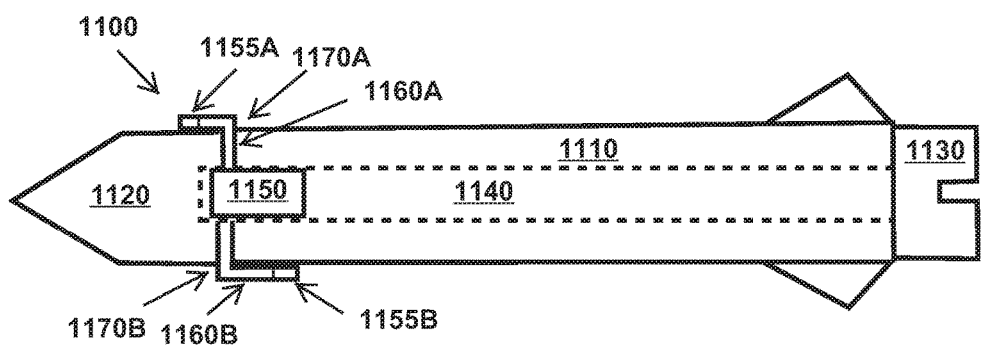
FIG. 11 is another arrow in accordance with an example embodiment.

FIG. 11 shows an arrow 1100 that includes a shaft 1110, an arrowhead 1120, and a nock 1130. The arrow 1100 includes an internal cavity 1140 (shown with dashed lines) with electronic components 1150 that include a wireless camera, a battery, and other electronic components. A first lens 1155A connects to a cable 1160A and extends from the electronic components 1150, and a second lens 1155B connects to a cable 1160B and extends from the electronic components 1150. The lenses 1155A and 1155B and cables 1160A and 1160B extend into and through openings, holes, or windows 1170A and 1170B that are located in the body of the arrow 1100. For illustration, lens 1155A is directed to a front direction or shooting direction of the arrow to capture images in front of the arrow, and lens 1155B is directed to a back direction or opposite the shooting direction of the arrow to capture images behind the arrow.

Lenses 1155A and 1155B are positioned through the openings 1170A and 1170B and mounted, attached, and/or engaged with a body of the arrow. For example, the cables 1160A and 1160B are flexible and bend or curve from the internal cavity 1140, through the openings 1170A and 1170B, and to the ambient environment.

Figure 12:
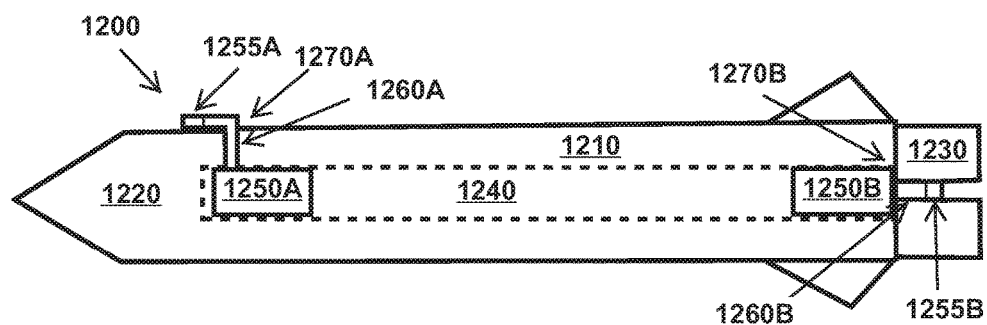
FIG. 12 is another arrow in accordance with an example embodiment.

FIG. 12 shows an arrow 1200 that includes a shaft 1210, an arrowhead 1220, and a nock 1230. The arrow 1200 includes an internal cavity 1240 (shown with dashed lines) with a first set of electronic components 1250A located at or adjacent to the arrowhead 1220 and a second set of electronic components 1250B located at or adjacent to the nock 1230. The electronic components 1250A and 1250B include a camera, battery, and other electronic components. A first lens 1255A connects to a cable 1260A and extends from the electronic components 1250A, and a second lens 1255B connects to a cable 1260B and extends from the electronic components 1250B. The lenses 1255A and 1255B and cables 1260A and 1260B extend into and through openings, holes, or windows 1270A and 1270B that are located in the body of the arrow 1100. Lens 1255A extends through the shaft 1210, and lens 1255B extends through the nock 1230. For illustration, lens 1255A is directed to a front direction or shooting direction of the arrow to capture images in front of the arrow, and lens 12556 is directed to a back direction or opposite the shooting direction of the arrow to capture images behind the arrow.

Figure 13:
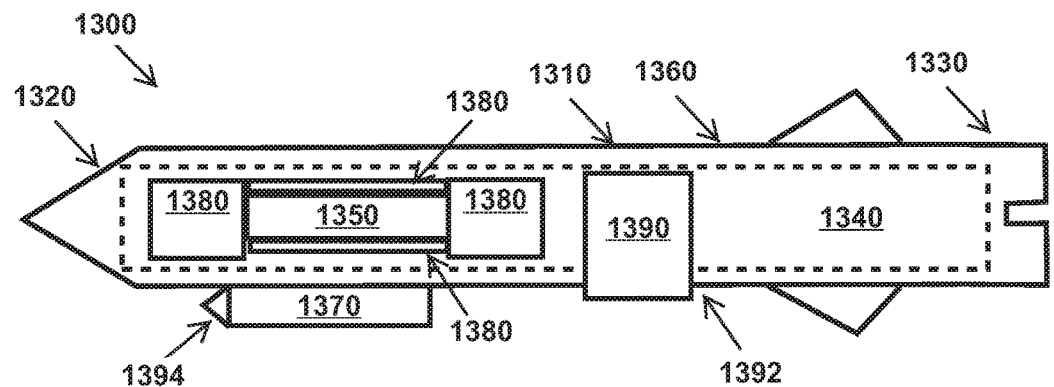
FIG. 13 is another arrow in accordance with an example embodiment.

FIG. 13 is an arrow 1300 that includes a shaft 1310, an arrowhead 1320, and a nock 1330. The arrow 1300 includes an internal cavity 1340 (shown with dashed lines) that includes one or more electrical components 1350 and includes an external body or surface 1360 that includes one or more electrical components 1370. The arrow includes electrical components that are external to a body of the arrow and electrical components that are internal to the body of the arrow. Example embodiments discussed herein provide examples of electrical components.

The arrow 1300 includes one or more shock absorbers 1380 that are located with, on, and/or adjacent to the electrical components 1350. The shock absorber 1380 absorbs and dissipates energy from the impact of the arrow on an object in order to protect the electrical components 1350 that are included with or enclosed in the arrow. Examples of a shock absorber include, but are not limited to, a spring, foam, rubber, gel, liquid, gas, polymer, composites, and other materials or apparatus that dampen, cushion, and/or absorb energy.

By way of example, a shock absorber is placed in front of the electronic components to protect the electronic components from damage when the arrow impacts an object after flight. For instance, the shock absorber is placed inside the shaft closer to the arrowhead than the electronic components that are also placed inside the shaft. As another example, a shock absorber is coated or lined along an interior surface of an arrow with a hollow shaft, hollow arrowhead, or hollow nock. This coating or lining protects the electronic components while housed in the arrow. As another example, the electronic components are housed or included in a package, and this package is covered or surrounded with the shock absorber. The package is then placed inside of the arrow or mounted to a surface of the arrow. As another example, the electronic components are sandwiched between shock absorbers. For instance, the shock absorber is positioned in a cylindrical hollow shaft of the arrow. The electronic components are assembled into an elongated cylindrical package or assembly, and this package is positioned in the shaft next to the shock absorber. An additional shock absorber is positioned in the shaft such that the shock absorbers engage each end of the package.

Some electrical components can be partially enclosed or housed in the hollow cavity of the arrow. FIG. 13 shows an electrical component 1390 in which part of the electrical component is included in the internal cavity 1340, and part of the electrical component is external to the internal cavity. A portion of the electrical component 1390 extends through a hole, opening, or window 1392 in the arrow. The electrical component 1390 extends through this opening to the ambient environment. Further, part of the electrical component extending to the exterior of the arrow can be connected or engaged with an exterior surface of the arrow, such as being connected to the shaft or arrowhead.

The electrical components 1370 are included in a housing that has a pointed and/or sharp tip 1394. By way of example, the tip 1394 has a conical shape or other shape to assist the housing in passing into and/or through the target. The tip and the housing further provide an aerodynamic shape during flight of the arrow, and this shape helps to ensure that the housing does not come dislodged from the arrow upon impacting a target.

Alternatively, the housing of electrical components can be designed to disengage from the arrow upon impacting the target. For instance, a snap fit connection connects the housing of the electrical components to the arrow. The electrical components include a GPS transmitter that transmits a location of the housing. When the arrow passes through a target, the housing disengages from the arrow and becomes lodged or embedded in the target so the GPS signal tracks a location of the target.

Consider an example in which the arrow encloses a wireless camera, transmitter, and battery. These electrical components are too large to fit completely inside of the internal cavity of the arrow. As such, a body of the arrow includes an opening or end through which a portion of these electrical components extends.

Figure 14:
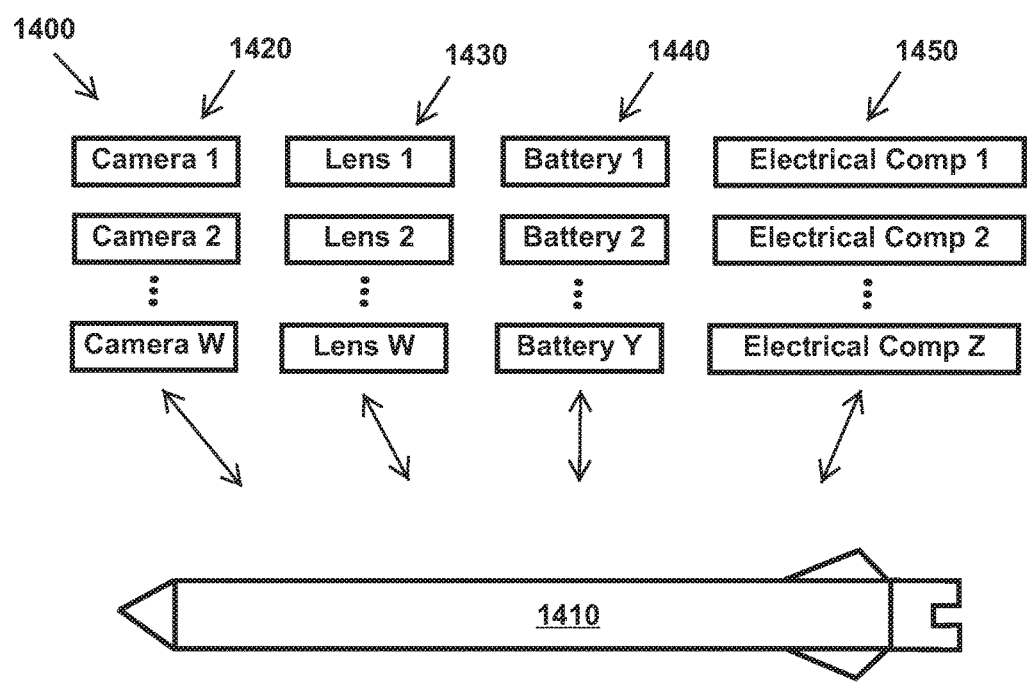
FIG. 14 is a diagram that shows electrical components that are connectable to, removable from, and interchangeable with an arrow in accordance with an example embodiment.

FIG. 14 is a diagram that shows electrical components 1400 that are connectable to, removable from, and interchangeable with an arrow 1410. By way of example, these electrical components include cameras 1420 (shown as camera 1, camera 2, . . . camera W), lenses 1430 (shown as lens 1, lens 2, . . . lens X), power sources or batteries 1440 (shown as battery 1, battery 2, . . . battery Y), and other electrical components 1450 (shown as electrical comp 1, electrical comp 2, . . . electrical comp Z). Example embodiments discussed herein provide examples of electrical components.

Consider an example in which an arrow includes a wireless camera and a lens. After the arrow impacts a target, the lens of the camera becomes scratched or damaged. The damaged lens is removed from the camera and replaced with a new lens.

Consider an example in which an arrow includes a battery that powers one or more electrical components. After a period of time, the battery loses its charge or becomes weak. The weak or depleted battery is removed from the arrow and replaced with a new or fully charged batter.

Consider an example in which an arrow includes a non-waterproof camera. A hunter desires to use the arrow for sports fishing. The non-waterproof camera is replaced with a waterproof camera so the camera can capture and transmit images after being shot into the water.

Consider an example in which an arrow includes a camera with an outdoor macro-lens that is design to be used during daytime. A hunter desires to use the arrow for hunting at night. The outdoor macro-lens is replaced or exchanged with an infrared lens or a thermal lens designed for nighttime use so the camera can capture and transmit images during nighttime. Captured images are transmitted to an HPED or a wearable electronic device.

Figure 15:
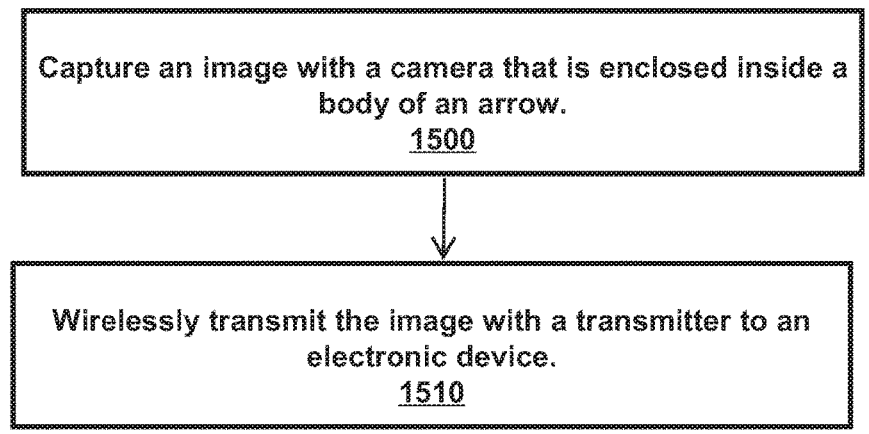
FIG. 15 is a method to wirelessly transmit an image from an arrow in accordance with an example embodiment.

FIG. 15 is a method to wirelessly transmit an image from an arrow.

Block 1500 states capture an image with a camera that is enclosed inside a body of an arrow. The camera captures images that are external to the arrow while the arrow is in flight and/or after the arrow impacts a target.

Block 1510 states wirelessly transmit the image with a transmitter to an electronic device. For example, the images transmit to another electronic device, a computer, a handheld portable electronic device (HPED), storage or memory, a server, a network, etc.

Consider an example in which the arrow has an elongated cylindrical body with a hollow shaft that forms an elongated cylindrical cavity. This cavity includes and houses a battery and a radio-frequency identification (RFID) chip that transmits information to an external electronic device. For instance, the RFID chip sends an identification and/or location signal. The external electronic device receives this signal and provides a global positioning system (GPS) coordinate of a location of the arrow. This coordinate assists a shooter in locating an arrow after it is shot from a bow.

Consider an example in which the arrow includes a thermographic camera that transmits infrared images to an HPED that is external to the arrow. These images are displayed on the HPED and assist a shooter in finding targets at night and aligning the arrow with the target while the arrow is mounted to the bow.

Consider an example in which a camera is mounted inside a cavity of an arrow or mounted to an external body of the arrow. This camera has two lenses. A first lens is pointed to capture images from a point-of-view of the arrowhead, and a second lens is pointed to capture images from a point-of-view of the nock. During flight of the arrow and after impact upon a target, the arrow simultaneously transmits and/or stores images from the first and second lenses. For instance, these images appear on a display of an HPED so a shooter or user can see images in front of the arrow and images behind the arrow.

Consider an example in which an arrow includes a body with an internal cavity that houses a photosensor that detects ambient light external to the arrow. The photosensor activates an electrical component or device, such as a light emitting diode (LED), in response to detecting ambient light conditions. For instance, the photosensor activates when the ambient light conditions become dark, such as activating after sunset. The LED assists the shooter in locating the arrow and automatically activates after sunset.

Consider an example in which an arrow includes a body with an internal cavity that houses a sensor or detector, such as a light dependent resistor, a light sensitive switch, photosensor, photodiode, photodetector, piezoelectric sensor, or other device that measures temperature, pressure, strain, light, acceleration, location, or force). This sensor or detector activates and provides a signal to another electrical device. For instance, a piezoelectric sensor senses impact of the arrow on a target and activates an RFID chip to transmit a location signal to an HPED or activates an LED in a nock of the arrow to illuminate. Further, the sensor or detector can be positioned in the arrow in order to activate when the arrow becomes embedded in a target or passes through the target. For instance, when the arrowhead is embedded inside of a target or passes through the target, activate an LED, an RFID chip, or a GPS chip. As another example, activation of the electrical component can occur when the arrow is launched from the bow. For instance, the sensor or detector senses or determines acceleration of the arrow from the bow and automatically triggers or activates the electrical component or device.

Consider an example in which an arrow has a nock and arrowhead that removably connect to and detach from a shaft of the arrow with a snap-fit connection, tapered connection, or threaded connection. A power source activates when the arrowhead and/or nock connects to the shaft. This power source then powers an electrical component housed in or connected to the arrow. For instance, a battery activates when the arrowhead connects to the shaft and powers one or more of a camera, a transmitter, a receiver, an LED, an RFID chip, a GPS chip, a sensor, a detector, and another electrical component.

Consider an example in which an arrow has a nock that includes an electrical component, such as a pressure sensor, pressure switch or micro-switch, or touch sensor or touch switch. This electrical component activates when the bowstring is positioned in the nock and/or when a shooter grips opposite sides of the nock, such as when the shooter positions the arrow in the bow or the bowstring and readies the arrow for launch. Activation of this electrical component in turn activates one or more of a power source, a camera, a transmitter, a receiver, an LED, an RFID chip, a GPS chip, a sensor, a detector, and another electrical component.

Consider an example in which an arrow includes a translucent or transparent nock with an internal cavity that houses or includes one or more electrical components. These electrical components activate when a shooter grips the nock or inserts a bowstring between the grooves of the nock. For instance, a switch detects a force of the bowstring in the nock and automatically activates an LED that illuminates the nock. The nock remains illuminated for a set period of time or until turned off.

Consider an example in which the arrow has a nock that illuminates. A hunter shoots an animal or prey (such as a deer) that runs or hides after being hit with the arrow. Illumination of the nock provides the hunter with a visible location of the arrow. Light from the nock would assist the hunter in finding the arrow and/or animal, especially if the ambient light were low such as at dusk, dark, deep woods, or heavy brush.

Consider an example in which the arrow has a tracking device embedded or housed inside a body of the arrow, such as a GPS chip, an RFID chip, a transmitter, or a tiny tracking device. A hunter shoots an animal or prey (such as a deer) that runs or hides after being hit with the arrow. Alternatively, the hunter misses and loses the arrow in the woods or heavy brush. The tracking device automatically activates upon impact of an object or launch from the bow. An HPED receives a signal from the tracking device and assists the hunter in locating the arrow. For instance, the HPED provides a current and real-time coordinate position of the arrow.

Consider an example in which the arrow has a tracking device and a temperature detector or sensor embedded or housed inside a body of the arrow. A hunter shoots a warm-blooded animal or prey (such as a deer) that runs or hides after being hit with the arrow. The temperature sensor activates the tracking device when the arrow hits the warm-blooded animal and the sensor senses a temperature different between the ambient temperature and the animal. The hunter wears a wearable electronic device with a display (such as electronic glasses or an electronic watch) that receives a signal from the tracking device and assists the hunter in locating the arrow.

Consider an example in which the arrow includes a window and one or more electronic devices enclosed in an internal cavity of a body of the arrow. These electronic devices include a display that project into or forms the window. Data captured with the electronic devices is displayed on the display. For instance, the display has a curved configuration that forms part of an external surface of the body of the arrow.

Consider an example in which an arrow has a hollow shaft that encloses a wireless camera and battery. A lens of the camera projects through a body of the shaft so the camera can capture images in front of the arrowhead. The camera transmits video images in real-time to a shooter that wears a wearable electronic device (WED). These images display on a display of the WED and enable the shooter to watch the flight of the arrow as it leaves the bow, travels through the air, and impacts a target. This video of the arrow is stored in memory for playback, transmission, editing, etc.

Consider an example in which an arrow has a first lens that captures images in front of the arrow, and a second lens that captures images behind the arrow. After the arrow launches toward a target, the shooter sees in real-time video from the first lens showing the arrow approaching and hitting the target and real-time video from the second lens showing the shooter immediately after shooting the arrow from the bow.

Consider an example in which an arrow has a hollow shaft that encloses tiny speakers. A shooter shoots the arrow at a target but the arrow becomes lost. Sounds emanate from the speakers and assist the shooter in locating the arrow. For instance, the arrow repeatedly emits a beeping sound or other audible sound. Further, the arrow can communicate with the shooter through an HPED, WED, or other electronic device. These electronic devices can control which sounds emanate from the speakers (e.g., a user selecting from a list of different sounds to emanate at the arrow). Additionally, the shooter can speak into a microphone at the electronic device and have these sounds transmitted to the arrow and speakers in real-time.

Consider an example in which several hunters are hunting together in a group. Each hunter has a bow with an arrow having a wireless camera. The hunters wear a WED that enables them to see real-time images that are being captured from each of the arrows of each of the hunters. For instance, hunter A views video being captured from his own camera, then switches or also views video being captured from hunter B and hunter C.

The optical lens can be different types and interchangeable with the camera. By way of example, the lens include, but are not limited to, a macro lens, micro lens, a zoom lens, a process lens, an infrared lens, an ultraviolet lens, a wide-angle lens, etc. Further, a single arrow can include multiple different lenses (e.g., an arrow that includes a macro lens and an infrared lens).

In example embodiments, the lens can be directed to a front direction or shooting direction of the arrow. As such, the lens captures images of the flight path or trajectory path after the arrow is launched from the bow. For example, the lens is pointed to align with the arrowhead, and the camera captures images of the flight path of the arrow and its target. The lens can also be directed to a back direction that is opposite to the shooting direction of the arrow. As such, the lens captures images away from the flight path or trajectory path after the arrow is launched from the bow. For example, the lens is pointed to align with the nock, and the camera captures images that occur behind the arrow as the arrow flies to the target (e.g., captures images of the shooter that just shot the arrow). Captured images are wirelessly transmitted to another electronic device, such as a computer or handheld portable electronic device (HPED). These images can also be stored in the camera.

The window is formed from or includes one or more of metal, glass, ceramic, polymer, composites, transparent material or coating, and/or translucent material or coating. As one example, the window is formed from a high-strength transparent material. For instance, an optically clear strong transparent polymer glass composite includes one or more polymers combine with glass fibers to form a fiber glass reinforced plastic (FRP) with an optical transparency of clear glass.

Such a composite is optically clear, impact resistant, lightweight, strong, and inexpensive to manufacture. A glass ribbon-reinforced transparent polymer composite provides low distortion, good optical transparency, and mechanical strength over a wide range of temperatures. As another example, the window is formed from one or more layers of polycarbonate and glass. As another example, the window is formed from a transparent aluminum-based ceramic, such as aluminum oxynitride.

The addition of electronic components can alter a forward of center (FOC) point or balance point of the arrow. The electronic components can be positioned inside the cavity at a location that minimizes a change to the FOC point or balance point. Additionally, this additional weight can be offset or countered by changing a design of the shaft, providing some electronic components on one side of the FOC point or balance point and other electronic components on another side of the FOC point or balance point, adding weight to an end of the shaft, reducing weight of the arrowhead, etc.

The electronic components can fit inside and be removable from different portions of the arrow, such as fitting inside the arrowhead, the shaft, and/or the nock. The electronic components can also be integrally formed with and not removable from the different portions of the arrow, such as being integrally formed with the arrowhead, the shaft, and/or the nock.

The electronic components can be shaped as a portion of the arrow or housed in an assembly that emulates a size and shape of the arrow. For example, one or more electronic components are housed in an assembly that has a housing or structure that is sized and shaped as a nock for the arrow. This nock removably connects to or engages with the shaft of the arrow. As another example, one or more electronic components are housed in an assembly that has a housing or structure that is sized and shaped as an arrowhead for the arrow. This arrowhead removably connects to or engages with the shaft of the arrow. As another example, electronic components (such as a wireless camera, lens, and battery) are housed in an assembly that has an elongated cylindrical shape. This cylindrical assembly has a diameter smaller than an inner diameter of a shaft of the arrow. As such, the cylindrical assembly slides into the shaft of the arrow and is housed therein.

The electronic components can be made and/or sold separately from the arrow or components of the arrow. Alternatively, the electronic components can be made and/or sold with the arrow or with components of the arrow. For example, an arrowhead is made and assembled to include a wireless camera. Users purchase the arrowhead with the camera already installed in or with the arrowhead. As another example, a nock is made and assembled to include an electronic component (such as an LED). Users purchase the nock with the electronic component already installed in or with the nock.

Figure 16:
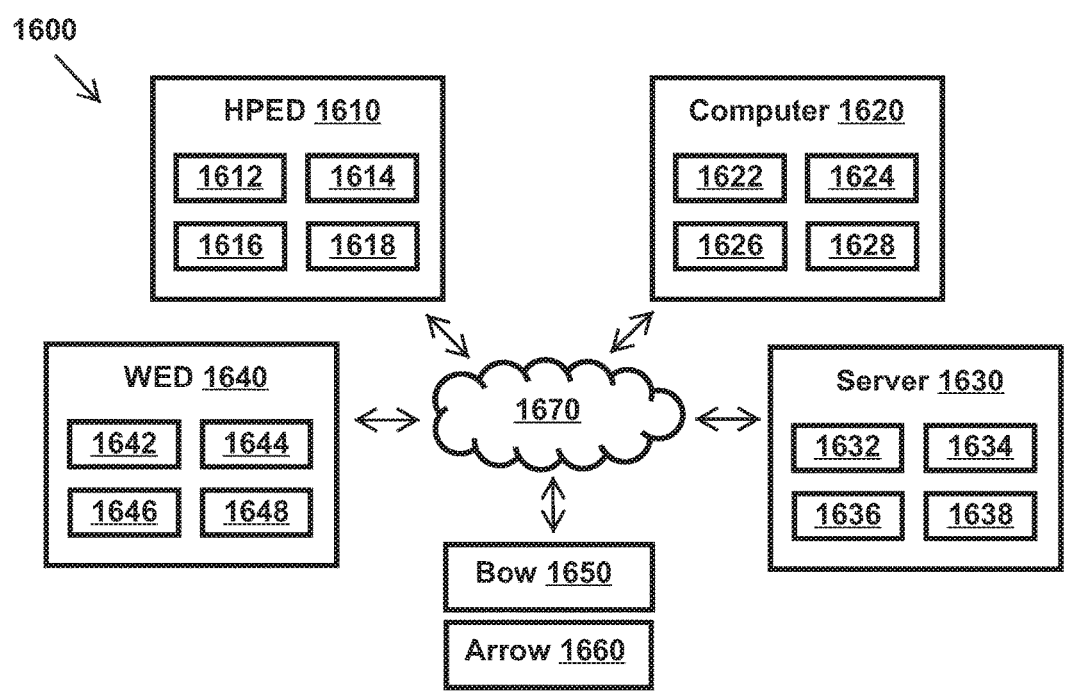
FIG. 16 is a computer system in accordance with an example embodiment.

FIG. 16 shows a computer system or electronic device system 1600 that includes a handheld portable electronic device (HPED) 1610, a computer 1620, a server 1630, a wearable electronic device (WED) 1640, and a bow 1650 and arrow 1660. One or more elements in the system 1600 can communicate with each other through one or more networks 1670. Blocks and/or methods discussed herein can be executed with the computer system and/or elements within the computer system.

The HPED 1610 includes a processor 1612, a memory 1614, a display 1616, and other electrical components 1618. The computer 1620 includes a processor 1622, a memory 1624, a display 1626, and other electrical components 1628. The server 1630 includes a processor 1632, a memory 1634, a display 1636, and other electrical components 1638. The wearable electronic device 1640 includes a processor 1642, a memory 1644, a display 1646, and other electrical components 1648. The arrow 1660 includes example embodiments discussed herein.

By way of example, the electronic devices shown in FIG. 16 include, but are not limited to, handheld portable electronic devices (HPEDs), wearable electronic glasses, watches, wearable electronic devices, portable electronic devices, computing devices, electronic devices with cellular or mobile phone capabilities, digital cameras, desktop computers, servers, portable computers (such as tablet and notebook computers), handheld audio playing devices (example, handheld devices for downloading and playing music and videos), personal digital assistants (PDAs), combinations of these devices, devices with a processor or processing unit and a memory, and other portable and non-portable electronic devices and systems.

The wearable electronic device is a portable electronic device that is worn on or attached to a person. Examples of such devices include, but are not limited to, electronic watches, electronic necklaces, electronic clothing, head-mounted displays, electronic eyeglasses or eye wear (such as glasses in which augmented reality imagery is projected through or reflected off a surface of a lens), electronic contact lenses (such as bionic contact lenses that enable augmented reality imagery), an eyetap, handheld displays that affix to a hand or wrist or arm (such as a handheld display with augmented reality imagery), and HPEDs that attach to or affix to a person.

The networks 1670 can include one or more of the internet, an intranet, an extranet, a cellular network, a local area network (LAN), a home area network (HAN), metropolitan area network (MAN), a wide area network (WAN), public and private networks, etc.

The processor (such as a central processing unit, CPU, microprocessor, application-specific integrated circuit (ASIC), etc.) controls the overall operation of memory (such as random access memory (RAM) for temporary data storage, read only memory (ROM) for permanent data storage, and firmware). The processor communicates with memory and performs operations and tasks that implement one or more blocks of the flow diagrams discussed herein. The memory, for example, stores applications, data, programs, algorithms (including software to implement or assist in implementing example embodiments) and other data.

In some example embodiments, the methods illustrated herein and data and instructions associated therewith are stored in respective memory or storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

Method blocks discussed herein can be automated and executed by a computer, computer system, user agent, and/or electronic device. The term "automated" means controlled operation of an apparatus, system, and/or process using computers and/or mechanical/electrical devices without the necessity of human intervention, observation, effort, and/or decision.

What is claimed is:

1. An arrow, comprising:
   an elongated cylindrical body including a first end, a second end, a side separate from the first end and the second end, an opening through the side of the body, and a cavity located inside of the body;
   an arrowhead connected to the first end of the body;
   a nock connected to the second end of the body; and
   a camera enclosed inside the cavity and surrounded by the body, and including a lens that extends through the opening in the side of the body and attaches to the side of the body such that the lens points toward the arrowhead to capture images from a point-of-view of the arrowhead.

2. The arrow of claim 1 further comprising:
   a flexible cable that connects the lens to the camera, passes through the opening, and bends toward the arrowhead.

3. The arrow of claim 1 further comprising:
   a power source enclosed inside the cavity; and
   a light emitting diode (LED) enclosed inside the cavity and connected to the power source, wherein the LED activates when the arrow impacts a target after flight of the arrow.

4. The arrow of claim 1 further comprising:
   a power source enclosed inside the cavity; and
   a light emitting diode (LED) enclosed inside the cavity and connected to the power source, wherein the body includes a transparent section, and the LED activates and transmits light through the transparent section to indicate when an electronic component inside the body is properly functioning.

5. The arrow of claim 1 further comprising:
   a sensor enclosed inside the cavity; and
   a display enclosed inside the cavity and viewable on the body, wherein the display displays information from the sensor.

6. The arrow of claim 1 further comprising:
   a power source enclosed inside the cavity; and
   a light emitting diode (LED) enclosed inside the cavity and connected to the power source, wherein the nock includes a transparent section, and the LED activates and illuminates the nock when the camera is turned on.

7. The arrow of claim 1 further comprising:
   a display enclosed inside the cavity and having a curved configuration that extends partially around the body such that a shape of the display emulates a shape of the body.

8. An arrow, comprising:
   an elongated cylindrical shaft including a first end, a second end, a side different from the first end and the second end, an opening through the side of the shaft, and a cavity located inside of the shaft;
   an arrowhead connected to the first end of the shaft;
   a nock connected to the second end of the shaft; and
   a camera surrounded by the shaft, enclosed inside the cavity, and including a lens that extends through the opening in the side of the shaft, wherein the lens attaches to the side of the shaft and points toward the nock to capture images from a point-of-view of the nock.

9. The arrow of claim 8 further comprising:
   a switch that turns the camera on and off, wherein the switch activates and turns the camera on when the shaft engages the arrowhead.

10. The arrow of claim 8 further comprising:
    a battery enclosed inside the cavity, wherein the battery powers the camera when the arrowhead screws and connects to the shaft in order to complete a circuit to power the camera.

11. The arrow of claim 8 further comprising:
    a power source enclosed inside the cavity; and
    a light emitting diode (LED) enclosed inside the cavity and connected to the power source, wherein the shaft includes a clear or transparent section, and the LED activates and illuminates light through the clear or transparent section when the camera is turned on.

12. The arrow of claim 8 further comprising:
    a power source enclosed inside the cavity; and
    a light emitting diode (LED) enclosed inside the cavity and connected to the power source, wherein the nock is made from a transparent or translucent material and illuminates with light from the LED when the camera is turned on.

13. The arrow of claim 8 further comprising:
    a display with a curved configuration that extends partially around the shaft such that an exterior surface of the display is flush with an exterior surface of the shaft of the arrow.

14. The arrow of claim 8, wherein the camera includes a second lens that attaches to the side of the shaft and points toward the arrowhead to capture images from a point-of-view of the arrowhead.

15. An arrow, comprising:
    an elongated cylindrical shaft having a first end, a second end, an internal cavity, an external surface with a side that is distinct from the first end and the second end, and an opening located in the side of the shaft and extending through the external surface to the internal cavity;
    an arrowhead engaged at the first end of the shaft;
    a nock engaged at the second end of the shaft; and
    a camera enclosed inside the internal cavity and surrounded by the shaft and including a lens that extends through the opening located in the side of the shaft and attaches to the external surface of the shaft such that the lens points toward the arrowhead and the camera captures images along a flight path of the arrow while the arrow is in flight.

16. The arrow of claim 15 further comprising:
    a flexible cable that connects the lens to the camera, wherein the flexible cable bends and passes through the opening.

17. The arrow of claim 15, wherein the side of the shaft includes a second opening that extends through the external surface to the internal cavity, and the camera includes a second lens that extends through the second opening located in the side of the shaft and attaches to the external surface of the shaft such that the second lens points toward the nock.

18. The arrow of claim 15 further comprising:
    a display with a curved configuration that extends partially around the shaft such that an exterior surface of the display is flush with the external surface of the shaft.

19. The arrow of claim 15 further comprising:
a shock absorber disclosed inside the internal cavity and positioned adjacent the camera, wherein the shock absorber absorbs and dissipates energy from impact of the arrow when the arrow impacts an object.

20. The arrow of claim 15 further comprising:
a power source enclosed inside the internal cavity of the shaft; and
a light emitting diode (LED) connected to the power source and enclosed inside the internal cavity of the shaft, wherein the LED activates when the arrow impacts a target after the flight of the arrow.

\* \* \* \* \*